United States Patent

[11] 3,582,533

[72] Inventors  Roy H. Albright
               Greensburg;
               Robert M. Clark, Ligonier, both of, Pa.
[21] Appl. No. 858,394
[22] Filed     Sept. 16, 1969
[45] Patented  June 1, 1971
[73] Assignee  ITE Imperial Corporation
               Philadelphia, Pa.

[54] UNDERGROUND TRANSMISSION SYSTEM EMPLOYING BARE CONDUCTORS SUPPORTED BY ELECTRICAL INSULATING FOAM
10 Claims, 3 Drawing Figs.

[52] U.S. Cl. .................................................. 174/37,
     61/72.4, 138/105, 174/98, 264/35, 264/45
[51] Int. Cl. ......................................... H02g 9/00,
                                                  H02g 1/00
[50] Field of Search ........................................ 174/37, 96,
     98; 138/105; 61/72.1, 72.2, 72.4; 25/128 E;
     264/35, 45, 47, 50, 51

[56]           References Cited
          UNITED STATES PATENTS
2,355,966   8/1944  Goff ........................... 61/72.1UX
3,112,183  11/1963  Goff ........................... 174/98UX
3,380,285   4/1968  Young ......................... 61/72.2
3,484,509  12/1969  Keller ......................... 264/45
3,503,800   3/1970  Eddy ........................... 61/72.1X
            FOREIGN PATENTS
1,318,191   1/1963  France ........................ 174/37
1,133,455  11/1968  Great Britain ................ 174/37

Primary Examiner—Laramie E. Askin
Attorney—Ostrolenk, Faber, Gerb & Soffen

ABSTRACT: High-voltage electric power is transmitted over long distances through bare conductors located underground and surrounded by a foam having insulating gas such as sulphurhexafluoride ($SF_6$) entrapped in the cells thereof. During installation the conductors are supported by means of insulating strings hanging from crossmembers laid across the top surface of an installation ditch until the foam structure solidifies, at which time the insulating strings are cut and the earth backfilled. The solidified foam provides the means of support for the conductors, with the entrapped gases providing the necessary insulation.

PATENTED JUN 1 1971

3,582,533

BACKFILL-24
GAS-FILLED FOAM-22
(e.g. EPOXY + SF₆)
23-METAL SHEET
25-PENETRATION RESISTANT LINER

DIRECTION OF PROGRESSION

INVENTORS
ROY H. ALBRIGHT
ROBERT M. CLARK
BY
Ostrolenk, Faber, Gerb & Soffen
ATTORNEYS

UNDERGROUND TRANSMISSION SYSTEM EMPLOYING BARE CONDUCTORS SUPPORTED BY ELECTRICAL INSULATING FOAM

This invention relates to the transmission of high-voltage electric power and, more particularly, to such transmissions through the use of bare or open-line-type conductors.

It is an established practice when transmitting electric power of the order of 345 kv. to insulatively support energized bare conductors from metal towers. These towers—and, more specifically, the porcelain insulator columns thereof—are chosen to be of sufficient length in order to limit high-voltage discharges to ground. For such 345 kv. service, the insulator columns are about 8½ feet high, and become even larger as the voltage is increased. In addition, the phase spacings for such electrical service is of the order of 15 feet, and they too increase with the voltage transmitted.

On the other hand, it has been recognized that these clearances may be reduced when buses of the metal-enclosed compressed-gas type are used in the electrical power distribution system, instead of bare conductors. Thus, when utilizing compressed-gas-insulated conductors centrally supported within a grounded metal tube of larger diameter, ground clearances of as little as 4 to 10 inches and phase spacings of as little as 24 to 42 inches can be used for the same 345 kv. voltage rating.

Furthermore, it has been realized that these compressed-gas-insulated conductors may be buried in the ground, to reduce any possible danger to life by having them exposed as well as to minimize any problems presented by the necessity of obtaining rights of way over the land traversed. In such environments, ditches are prepared for the installation of the compressed-gas-insulated bus, with the bus then being covered over by nonconducting material (e.g. a nonconducting sand) over substantially the entire length of the installation. As commonly employed, these buses employ a metal conductor insulated from the enclosure tube by means of sulfur hexafluoride ($SF_6$) having a high dielectric characteristic.

As will become clear hereinafter, the underground transmission system of the present invention is one in which a more economical means is provided to conduct electrical power at these high voltages. Bare conductors are here employed rather than compressed-gas buses, and are supported by a foam having insulating gases entrapped in its cells. The amount of foam required is dictated, in general, by the voltage to which the conductors will be energized, with the entrapped gases being of a type having a high dielectric strength to act as an electrical insulating medium for the energized conductors. A feature of the invention is that the bare conductors and support foam can be put down at a cost significantly less than that associated with deployment of compressed-gas insulated buses, yet without deleteriously affecting the electrical and mechanical characteristics thereof. These and other advantages of the invention will become clear from a consideration of the following description taken in connection with the accompanying drawings in which:

Figure 1:
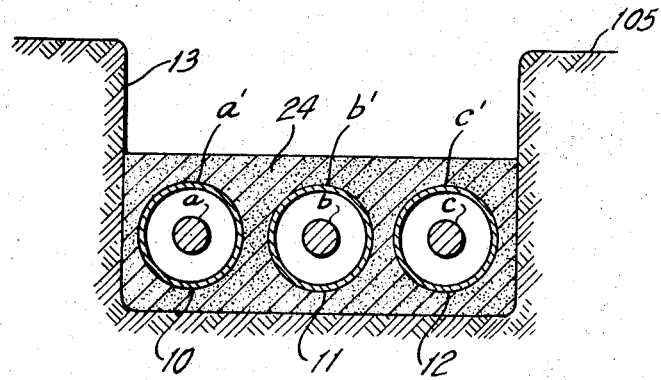
FIG. 1 shows a cross section view of an underground transmission system employing compressed-gas-insulated conductors as employed in the prior art.

Referring, first, to the prior art configuration of FIG. 1, the reference numerals 10, 11, 12 represent cross-sectional views of three compressed-gas-insulated conductors employed in an underground transmission system. As shown, each bus comprises a metallic conductor $a$, $b$ or $c$ surrounded by an enclosure tube $a'$, $b'$, or $c'$ respectively within which there is stored a gas such as sulfur hexafluoride (SF6) having a high dielectric characteristic. These buses are laid within a ditch 13, and are covered over with a nonconducting material 24, such as a nonconducting sand. It will readily be appreciated that a nonconducting material is required in order to reduce the voltage gradient at the top surface 105 of the installation to a level at which the possibility of danger to any person in the area is small. While such prior art configuration proves quite satisfactory from an operational standpoint, the system of the invention now to be described provides a more economical means to transmit comparable electric powers at the same high voltages.

Figure 2:
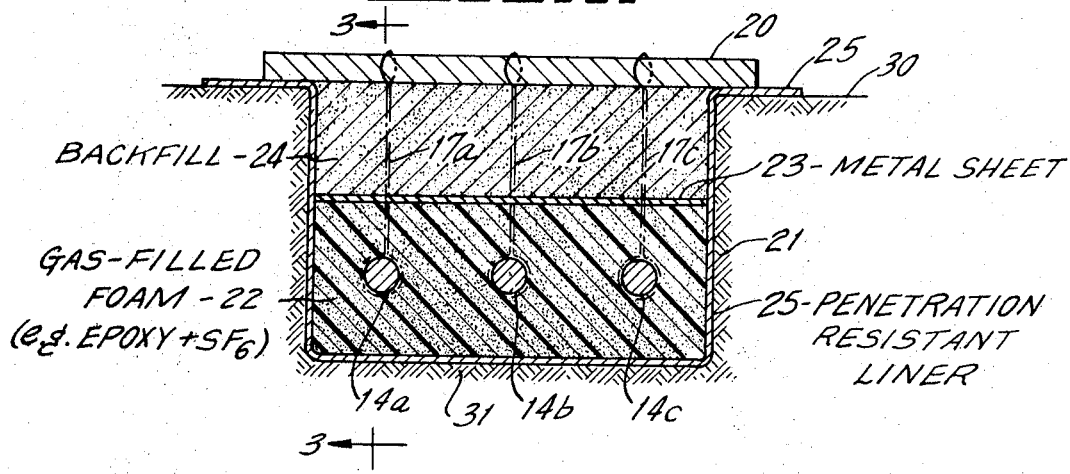
FIG. 2 shows a cross section of an underground transmission system embodying the principles of the present invention taken along the line 2-2 of FIG. 3.

Thus, in FIG. 2 three bare conductors 14a, 14b, 14c are similarly shown, and in the installation thereof, will be understood as being supported for a time being by insulating strings 17a, 17b, 17c from a crossmember 20 laid across the ditch 21. The insulating strings 17a, 17b, 17c may be composed of twine, nylon or Teflon material, for example, and are used in supporting the conductors 14a, 14b, 14c in the initial stage of the installation. The strings 17a, 17b, 17c are spaced along the length of the respective conductors 14a, 14b, 14c in a manner dependent on the size of the string, the weight of the individual conductor, and the contour of the land.

The conductors 14a, 14b, 14c are then surrounded— as by spraying— with a closed-cell foam 22 (e.g. epoxy), which has insulating gas entrapped in the cells thereof. The amount of foam needed is dependent upon the voltage to which the conductors will be energized, with the insulating gas in one embodiment of the invention being the above-mentioned sulphurhexafluoride. After the foam structure (generally denoted by reference numeral 22) solidifies, the insulating 17a, 17b, 17c may be cut, as the foam structure 22 itself will then support the conductors 14a, 14b, 14c. A metal or other conductive sheet 23 is then laid on top of the foam 22 to provide an electrical ground to inhibit stray voltage gradients and to protect the foam 22 when the ditch 21 is backfilled, this time with earth (generally denoted by reference numeral 24). A metal shield 25 or similar such lining can be previously sprayed on or laid down along the sides and bottom 31 of the ditch 21 to prevent worms, rodents, etc. from penetrating the foam structure 22 to weaken the support provided thereby.

Since the foam 22 is, by and large, a poor conductor of heat, means may be provided to dissipate that heat which is generated in the conductor 14a, 14b, 14c by current flow. If the conductors 14a, 14b, 14c are of hollow tubular construction, for example, air or a liquid coolant can be circulated therethrough to remove some of the heat generated and to limit any temperature rise that may set in.

Figure 3:
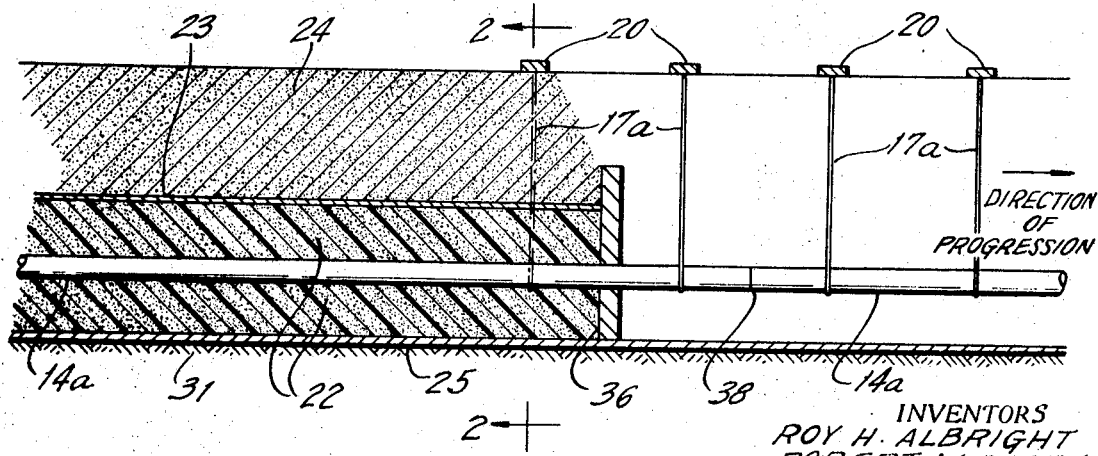
FIG. 3 schematically shows a length of an underground transmission network as it would be set up employing the teachings of the invention and is taken along the line 3-3 of FIG. 2.

FIG. 3 shows the underground transmission installation, taken along the line 3-3 of FIG. 2 which can be made by welding or joining individual conductors 14a at specified intervals, and by supporting and electrically insulating each bare conductor 14a with foam 22 having the entrapped, high dielectric gas. Reference numerals 30 and 31 in the drawing represent the surface ground level and the bottom of the ditch respectively in which the installation is to be made. The crossmembers 20 and the insulating strings 17a serve to support the bare conductor 14a until the closed cell foam 22 solidifies. A wood or similar such form 36 is also shown, and is used to support the conductor 14a and to hold it in place while it is being joined (e.g. by a weld) to a second conductor 14a along the direction of laying of the network. Such a joint is schematically represented by the reference numeral 38 in FIG. 3.

Reference numeral 24 represents the earth backfill for the ditch. The conductive sheet 23 is used to provide the electrical ground to reduce voltage gradients and to protect the foam 22 when the ditch is backfilled with the earth. The gas entrapped in the foam 22 may again be sulfur hexafluoride or any such gas having a high dielectric characteristic. In the installation, the foam 22 is first permitted to solidify to support the conductors 14a, 14b and 14c, after which the insulating strings 17a, 17b, 17c may be cut and the crossmembers 20 removed. As with the installation of FIG. 2, the bottom of the ditch 31 is first sprayed or lined with a metallic shield 25 before the foam is applied.

It will thus be seen from the above description that the electrical properties which are provided by a compressed-gas-insulated conductor system are maintained by the entrapped gas of the system of the present invention. The electrical characteristics exhibited by the present setup is, therefore, comparable to that present with the prior art construction in FIG. 1. However, it will be noted, that the use of the bare conductor arrangement of the invention enables a significant cost reduction, particularly with respect to those elements which transmit the electric power from point of generation to point of utilization.

The embodiments of the invention in which we claim an exclusive privilege or property are defined as follows:

1. A system for transmitting high-voltage electric currents from a point of generation to a point of utilization, comprising:
    a bare conductor carrying said high-voltage electric current; and
    an underground installation through which said bare conductor runs to carry said current, said conductor being supported in said installation by a closed-cell foam surrounding said conductor and having electrical insulating gas entrapped therein of a high dielectric characteristic.

2. The system of claim 1, in which said underground installation also includes a conductive layer atop said foam for protecting said foam when said installation is backfilled and for reducing the voltage gradient otherwise produced at the top surface of said installation by the high-voltage electric currents passing through said conductor.

3. The system of claim 2, in which there is also provided a penetration-resistant material along the sides and bottom of the underground installation to prevent destruction of said foam by external elements.

4. The system of claim 3, in which said insulating entrapped gas is sulfur hexafluoride.

5. The system of claim 3, in which said foam is of an epoxy structure.

6. A method of providing an underground transmission system for the carrying of high-voltage electric currents through a ditch or similar such enclosure from a point of generation to a point of utilization comprising the steps of:
    a. suspending a current-carrying bare conductor within said ditch by an insulating member;
    b. surrounding said conductor with a closed-cell foam having electrically insulating entrapped gas therein which exhibits a high dielectric characteristic;
    c. permitting said foam to solidify to support said conductor; and
    d. covering said solidified foam with a backfill material to close said ditch.

7. The method of claim 6, in which following step c. and preceding step d. there is included the additional step of putting down a conductive layer over said solidified foam to protect said foam when said ditch is backfilled and to reduce the voltage gradient otherwise produced at the top surface of said closed ditch by the high-voltage electric currents passing through said bare conductor.

8. The method of claim 7, in which prior to step b. there is included the additional step of lining the bottom and at least a portion of the sides of said ditch with a penetration-resistant material.

9. The method of claim 7, in which step b. comprises surrounding said conductor with a closed-cell foam having sulphurhexafluoride gas entrapped therein.

10. The method of claim 7, in which step b. comprises surrounding said conductor with a closed-cell foam of an epoxy structure.